(12) United States Patent
Iijima et al.

(10) Patent No.: US 10,999,134 B2
(45) Date of Patent: May 4, 2021

(54) COMMUNICATION SYSTEM, MOBILE STATION APPARATUS, BASE STATION APPARATUS, COMMUNICATION DEVICE, AND COMMUNICATION METHOD

(71) Applicant: SHARP KABUSHIKI KAISHA, Sakai (JP)

(72) Inventors: Kennichi Iijima, Sakai (JP); Shuichi Takehana, Sakai (JP); Shigeto Suzuki, Sakai (JP); Makoto Yamamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 26 days.

(21) Appl. No.: 16/515,901

(22) Filed: Jul. 18, 2019

(65) Prior Publication Data
US 2020/0052959 A1 Feb. 13, 2020

(30) Foreign Application Priority Data
Aug. 8, 2018 (JP) .............................. JP2018-149555

(51) Int. Cl.
*H04L 12/24* (2006.01)
*H04B 7/06* (2006.01)
(Continued)

(52) U.S. Cl.
CPC ....... *H04L 41/0803* (2013.01); *H04B 7/0617* (2013.01); *H04W 72/048* (2013.01); *H04L 67/12* (2013.01)

(58) Field of Classification Search
CPC ... H04L 41/0803; H04L 67/12; H04B 7/0617; H04B 7/026; H04W 72/048; H04W 4/50; H04W 4/44; H04W 24/02; H04W 88/08
See application file for complete search history.

(56) References Cited

U.S. PATENT DOCUMENTS

2008/0014956 A1  1/2008 Balasubramanian
2019/0124660 A1* 4/2019 Huang .............. H04W 72/0453
(Continued)

FOREIGN PATENT DOCUMENTS

CN  106375484 A  *  2/2017
JP  2015-233288 A  12/2015

*Primary Examiner* — Shailendra Kumar
(74) *Attorney, Agent, or Firm* — ScienBiziP, P.C.

(57) ABSTRACT

A communication system includes a base station apparatus, a mobile station apparatus, and a communication device. The base station apparatus performs communication with one or a plurality of the communication devices via the mobile station apparatus. The mobile station apparatus includes a first mobile station communicator that performs first communication with the base station apparatus, a second mobile station communicator that performs second communication with the communication device, and a mobile station controller that acquires a device type of the communication device and, on the basis of the device type thus acquired, generates request information for requesting the base station apparatus for a communication control configuration of the first communication. The base station apparatus includes a base station controller that, in accordance with the request information, configures communication control appropriate to the device type of the communication device over the first communication with the mobile station apparatus.

12 Claims, 6 Drawing Sheets

(51) Int. Cl.
*H04W 72/04* (2009.01)
*H04L 29/08* (2006.01)

(56) References Cited

U.S. PATENT DOCUMENTS

2020/0137780 A1\* 4/2020 Kim ..................... H04L 5/0007
2020/0229206 A1\* 7/2020 Badic ................... H04W 40/24

\* cited by examiner

FIG.2

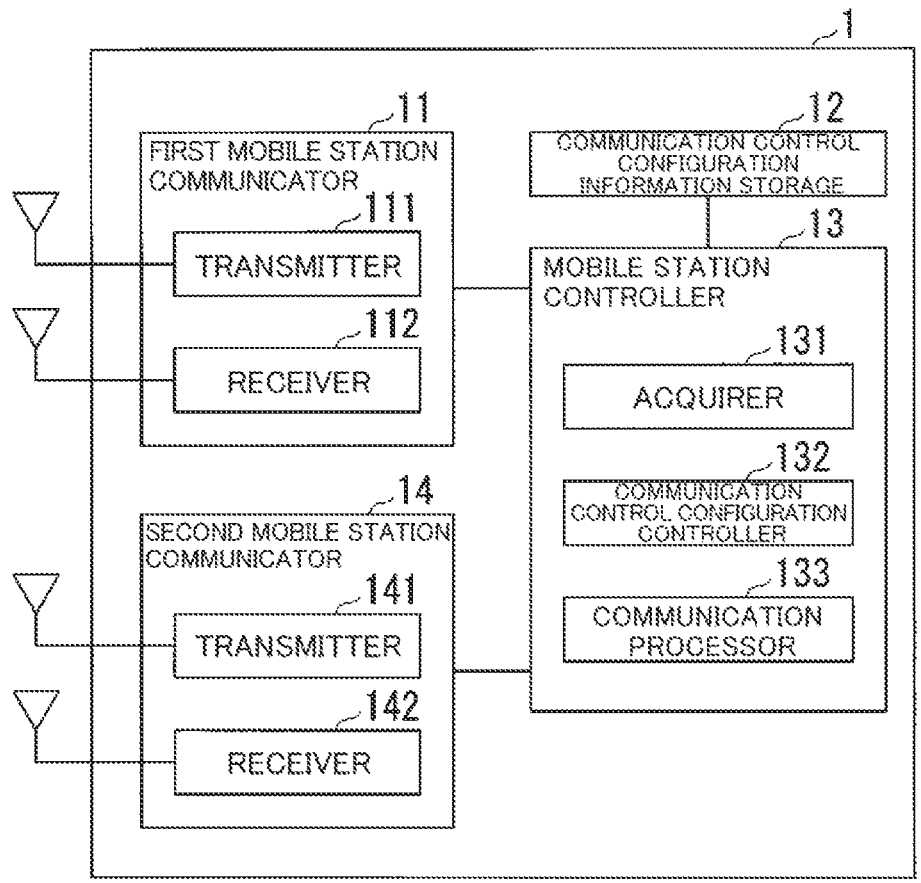

FIG.3

| COMMUNICATION CONTROL CONFIGURATION NUMBER | COMMUNICATION MODE |
|---|---|
| 1 | 5G HIGH-CAPACITY DOWNLINK COMMUNICATION (PEAK DATA RATE 20 Gbps OR HIGHER) |
| 2 | 5G HIGH-CAPACITY UPLINK COMMUNICATION (PEAK DATA RATE 10 Gbps OR HIGHER) |
| 3 | 5G LOW-DELAY COMMUNICATION LEVEL 1 (WIRELESS SECTION 1 ms OR SHORTER) |
| 4 | 5G LOW-DELAY COMMUNICATION LEVEL 2 (WIRELESS SECTION 5 ms OR SHORTER) |
| 5 | 5G LOW-DELAY COMMUNICATION LEVEL 3 (WIRELESS SECTION 10 ms OR SHORTER) |
| 6 | 5G HIGH-RELIABILITY COMMUNICATION (SUCCESS RATE OF PACKET TRANSMISSION 99.999% OR HIGHER) |
| 7 | Reserved |
| 8 | LTE-EQUIVALENT COMMUNICATION |

FIG.6

| Connected Equipment | Type Information | First State Information | First State Number | Second State Information | Second State Number | \multicolumn{8}{c}{Corresponding Control Configuration Number} |
|---|---|---|---|---|---|---|---|---|---|---|---|---|---|
| | | | | | | 1 | 2 | 3 | 4 | 5 | 6 | 7 | 8 |
| AUTOMOBILE | 1 | RUNNING | 1 | SPEED OF 30 km/h OR HIGHER | 1 | ○ | | | | | | | |
| | | | | SPEED OF 10 km/h OR HIGHER | 2 | | | ○ | | | ○ | | |
| | | | | SPEED OF 5 km/h OR HIGHER | 3 | | | | | ○ | | | |
| | | | | SPEED OF LESS THAN 5 km/h | 4 | | | | ○ | | | | |
| | | NOT RUNNING | 2 | POSSIBILITY OF BEING REAR-ENDED | 1 | ○ | | | | | | | |
| | | | | NO POSSIBILITY OF BEING REAR-ENDED | 2 | ○ | | | | | | | |
| DISPLAY DEVICE (SUCH AS 8K MONITOR OR HMD) | 2 | DISPLAY ON | 1 | | | ○ | | | | | ○ | | |
| | | DISPLAY OFF | 2 | | | | | | | | | ○ | |
| BICYCLE | 3 | RUNNING | 1 | SPEED OF 5 km/h OR HIGHER | 1 | | | ○ | | | | ○ | |
| | | | | SPEED OF LESS THAN 5 km/h | 2 | ○ | | | | | | | |
| | | NOT RUNNING | 2 | | 1 | ○ | | | | | | | |
| CAMERA (SUCH AS 8K CAMERA OR SMARTPHONE) | 4 | MOVING IMAGE UL | 1 | | 1 | | ○ | | | | | | |
| | | STILL IMAGE UL | 2 | | 1 | | | | | | | | |
| GAME MACHINE | 5 | HIGH IMAGE QUALITY TYPE | 1 | | 1 | ○ | ○ | ○ | | | | | |
| | | ROBOT OPERATING TYPE | 2 | | 1 | ○ | ○ | ○ | | | | | ○ |
| | | SHOGI TYPE | 3 | | 1 | | | | | | | | |
| IoT EQUIPMENT | 6 | HOUSEHOLD ELECTRICAL APPLIANCE | | | 1 | | | | | | ○ | ○ | ○ |
| | WEARABLE | 7 | | | | 1 | | | | | | | ○ |

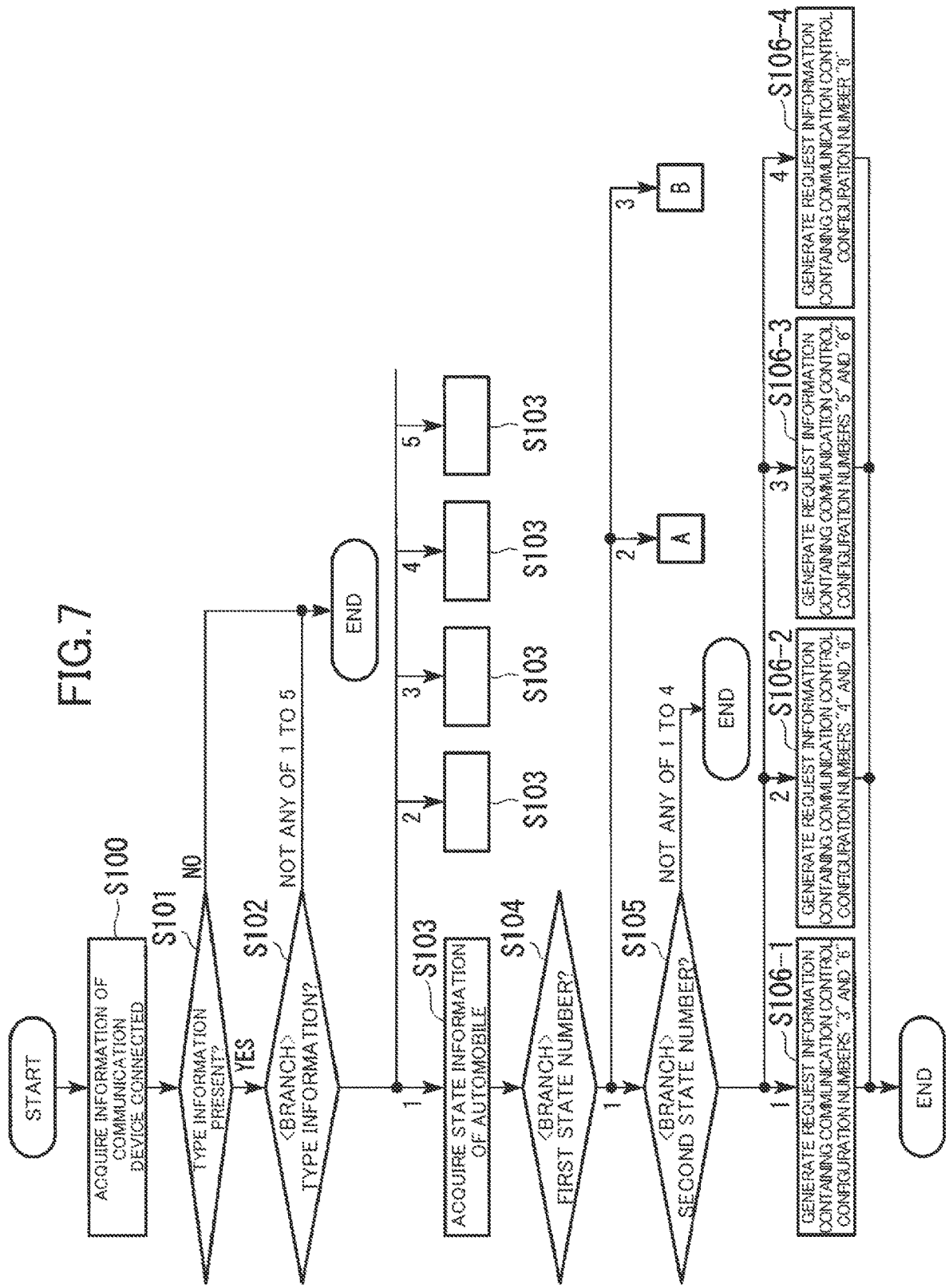

COMMUNICATION SYSTEM, MOBILE STATION APPARATUS, BASE STATION APPARATUS, COMMUNICATION DEVICE, AND COMMUNICATION METHOD

BACKGROUND

1. Field

The present disclosure relates to a communication system, a mobile station apparatus, a base station apparatus, a communication device, and a communication method.

2. Description of the Related Art

With the development of wireless communications technology, portable information devices such as portable telephones prevail. Various qualities of service are required of portable information terminals in communications. For example, Japanese Unexamined Patent Application Publication No. 2015-233288 discloses a technology by which in a case where a traffic flow is based on a plurality of applications, negotiations for radio resource assignment and the like are conducted about a total QoS obtained by summing up each individual QoS.

Incidentally, in the field of wireless communications, dithering may be used. Tethering refers, for example, to the permanent connection of a communication device to a network with the communication device connected to a portable telephone device allowed to serve as a modem.

However, with the technology disclosed in Japanese Unexamined Patent Application Publication No. 2015-233288, the portable telephone device has been unable to conduct negotiations based on each individual QoS as appropriate for each communication device to be tethered (such communication devices being also referred to as "tethering partners"). That is, with the technology disclosed in Japanese Unexamined Patent Application Publication No. 2015-233288, the portable telephone device has been undesirably unable to exercise communication control such as radio resource assignment for each tethering partner.

It is desirable to provide a communication system, a mobile station apparatus, a base station apparatus, a communication device, and a communication method that provide proper communication control.

SUMMARY

According to an aspect of the disclosure, there is provided a communication system including a base station apparatus, a mobile station apparatus, and a communication device. The base station apparatus performs communication with one or a plurality of the communication devices via the mobile station apparatus. The mobile station apparatus includes a first mobile station communicator, a second mobile station communicator, and a mobile station controller. The first mobile station communicator performs first communication with the base station apparatus. The second mobile station communicator performs second communication with the communication device. The mobile station controller acquires a device type of the communication device and, on the basis of the device type thus acquired, generates request information for requesting the base station apparatus for a communication control configuration of the first communication. The base station apparatus includes a base station controller. In accordance with the request information, the base station controller configures communication control appropriate to the device type of the communication device over the first communication with the mobile station apparatus.

According to another aspect of the disclosure, there is provided a communication system. In accordance with the communication control configured over the first communication, the mobile station controller configures communication control appropriate to the device type of the communication device over the second communication between the mobile station apparatus and the communication device.

According to another aspect of the disclosure, there is provided a communication system. The mobile station controller acquires state information corresponding to the device type of the communication device and indicating a state of the communication device and generates the request information on the basis of the state information.

According to another aspect of the disclosure, there is provided a communication system. The mobile station controller generates the request information on the basis of state information indicating a state of a driving part of a vehicle.

According to another aspect of the disclosure, there is provided a communication system. The mobile station controller generates the request information on the basis of state information indicating a state of running of a vehicle.

According to another aspect of the disclosure, there is provided a communication system. The mobile station controller generates the request information on the basis of state information indicating a display state of a display device.

According to another aspect of the disclosure, there is provided a communication system. In accordance with the request information, the base station controller switches the first communication to a higher frequency band of communication based on beamforming.

According to another aspect of the disclosure, there is provided a communication system. In accordance with the request information, the base station controller switches the first communication to communication whose slot length or symbol length varies according to subcarrier spacing.

According to another aspect of the disclosure, there is provided a mobile station apparatus including a first mobile station communicator, a second mobile station communicator, and a mobile station controller. The first mobile station communicator performs first communication with the base station apparatus. The second mobile station communicator performs second communication with one or a plurality of communication devices. The mobile station controller acquires a device type of any of the communication devices and, on the basis of the device type thus acquired, generates request information for respecting the base station apparatus for a communication control configuration of the first communication.

According to another aspect of the disclosure, there is provided a base station apparatus including a base station communicator, and a base station controller. The base station communicator performs communication with a mobile station apparatus and receives, from the mobile station apparatus, request information that is generated on the basis of a device type of a communication device. In accordance with the request information, the base station controller configures communication control appropriate to the device type of the communication device over the communication with the mobile station apparatus.

According to another aspect of the disclosure, there is provided a communication device including a communication device controller and a communication device communicator. The communication device controller acquires a device type of the communication device. The communication device communicator performs communication with a mobile station apparatus, transmits the device type to the mobile station apparatus, and performs communication with a base station apparatus via the mobile station apparatus in a communication control configuration appropriate to the device type.

According to another aspect of the disclosure, there is provided a communication method of a mobile station apparatus. The communication method includes performing first communication with a base station apparatus, performing second communication with one or a plurality of communication devices, acquiring a device type of any of the communication devices, and generating, on the basis of the device type thus acquired, request information for requesting the base station apparatus for a communication control configuration of the first communication.

Advantageous Effects of Invention

An aspect of the disclosure advantageously provides proper communication control.

BRIEF DESCRIPTION OF THE DRAWINGS

FIG. 2 is a block diagram of a mobile station apparatus according to the first embodiment;

FIG. 3 is a table showing communication control configuration information according to the first embodiment;

FIG. 6 is a table showing communication control configuration request information according to the first embodiment;

FIG. 7 is a flow chart showing an example of flow of a process of a mobile station apparatus in the communication system according to the first embodiment of the present disclosure and communication systems according to second to fifth embodiments of the present disclosure;

DESCRIPTION OF THE EMBODIMENTS

First Embodiment

Figure 1:
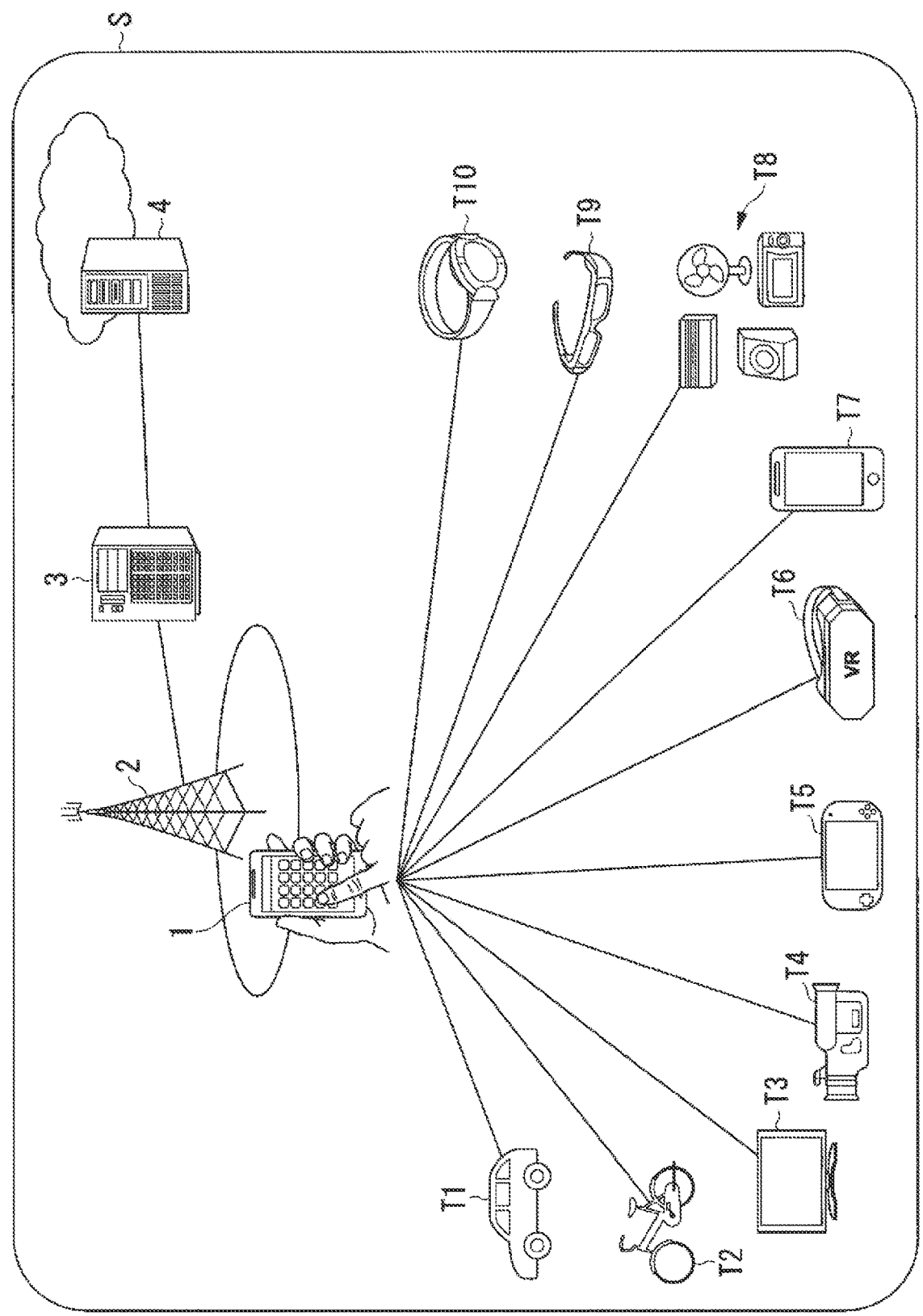
FIG. 1 is a network configuration diagram showing an example of application of a communication method according to a first embodiment of the present disclosure.

A first embodiment of the present disclosure is described below with reference to the drawings.
Communication System FIG. 1 is a diagram showing an example of a communication system S according to the first embodiment. The communication system S according to the first embodiment includes a mobile station apparatus 1, communication devices T1 to T10, a base station apparatus 2, a transmitting apparatus 3, and a content server 4. Each of the communication devices T1 to T10 is connected to the base station apparatus 2 via the mobile station apparatus 1 by means of a tethering function of the mobile station apparatus 1.

That is, the communication devices T1 to T10 use the mobile station apparatus 1 to perform communication with the content server 4 by way of the base station apparatus 2 and the transmitting apparatus 3. The communication devices T1 to T10 use this communication to download data such as content from the content server 4 or upload data. It should be noted that one or a plurality of the communication devices T1 to T10 are hereinafter referred to as "communication devices T".

In FIG. 1, the base station apparatus 2 performs communication with one or a plurality of the communication devices T via the mobile station apparatus 1. The mobile station apparatus 1 performs cellular communication (which is an example of first communication) with the base station apparatus 2 and performs Wi-Fi (registered trademark) communication (which is an example of second communication) with any of the communication devices T.

The mobile station apparatus 1 acquires the device type of the communication device T and, on the basis of the device type thus acquired, generates request information for requesting the base station apparatus 2 for a communication control configuration of the cellular communication. In accordance with this request information, the base station apparatus 2 configures communication control appropriate to the device type of the communication device 1 over the cellular communication with the mobile station apparatus 1.

This allows the communication system S to configure proper communication control over the cellular communication between the mobile station apparatus 1 and the base station apparatus 2 according to the device type of the communication device T.

Each of the apparatuses and devices of FIG. 1 is described in detail below.

The communication devices T are things that have communication functions. Examples of the communication devices T include vehicles such as an automobile T1 and a bicycle T2. Other examples of the communication devices T include audio-visual equipment (display devices), game equipment, and information terminal devices such as an 8K liquid crystal television T3, a video camera T4, a portable game machine T5, a virtual reality (VR) apparatus T6 constituted by an HMD (head-mounted display), a tablet PC T7, smartglasses T9, and headphones T10. Other examples of the communication devices T include household electrical appliances such as an air conditioner T8.

The term "8K liquid crystal television" here refers to a liquid crystal television whose screen is constituted by 7680 pixels crosswise and 4320 pixels lengthwise. Further, the term "HMD" here refers to a display device that is worn on the head.

The communication devices T are connected to the mobile station apparatus 1 by a wireless communication technique based, for example, on Wi-Fi (registered trademark). Note, however, that the communication devices T may be connected to the mobile station apparatus 1 by a near-field wireless communication technique such as Bluetooth (registered trademark) or by a cable communication technique such as Universal Serial Bus (USB) (registered trademark).

The mobile station apparatus 1 is connected to the base station apparatus 2 by wireless cellular communications technology. The mobile station apparatus 1 performs communication by means of either or both the fourth-generation wireless communications technology (LTE: Long-Term Evolution: registered trademark. Also referred to as "4G communication") and/or the fifth-generation wireless communications technology (also referred to as "5G communication"). Note here that 4G communication and 5G communication differ in requirement for communication control from each other. Examples of requirements for communication control include, but are not limited to, a peak data rate, an amount of delay in a wireless section, and a success rate of packet transmission. A connection between the base station apparatus 2 and the transmitting apparatus 3 and a connection between the transmitting apparatus 3 and the content server 4 may be made by a cable communication technique such as the Internet or Ethernet (registered trademark) or by a wireless communication technique such as microwave transmission.

Mobile Station Apparatus

FIG. 2 is a block diagram of the mobile station apparatus 1 according to the first embodiment. The mobile station apparatus 1 includes a first mobile station communicator 11, a communication control configuration information storage 12, a mobile station controller 13, and a second mobile station communicator 14. The first mobile station communicator 11 includes a transmitter 111 and a receiver 112. The mobile station controller 13 includes an acquirer 131, a communication control configuration controller 132, and a communication processor 133. The second mobile station communicator 14 includes a transmitter 141 and a receiver 142.

The first mobile station communicator 11 uses the transmitter 111 and the receiver 112 to communicate with the base station apparatus 2. The communication control configuration information storage 12 has stored therein configuration information pertaining to communication control configurations (such information being also referred to as "communication control configuration information"). The term "communication control configuration information" here refers to information associated with a communication mode for each communication control configuration number about communication between the base station apparatus 2 and the mobile station apparatus 1 (see FIG. 3). The communication mode is a mode appropriate to a communication speed (such as a peak data rate), a communication delay (such as an amount of delay that is allowed in an end-to-end wireless section), or communication reliability (such as a success rate of packet transmission). Each communication mode is associated, for example, with communication control appropriate to the communication mode (such as priority control or band control based on QoS being used in 4G communication and/or 5G communication).

Further, the communication control configuration information storage 12 has stored therein a table pertaining to communication control configurations that are requested (such a table being also referred to as "communication control configuration request information table"). The communication control configuration request information table pertains to communication control configurations for which the mobile station apparatus 1 requests the base station apparatus 2. The communication control configuration request information table indicates communication control configuration numbers that correspond to type information and state information of the communication devices T. The state information may include plural types of state information. The first embodiment uses two types of state information, namely first state information and second state information. Alternatively, three or more types of state information may be used. The first embodiment has a first state number and a second state number that correspond to first state information and second state information, respectively.

The transmitter 111 transmits, to the base station apparatus 2, various types of data, control information, and request information pertaining to communication control configurations (such information being also referred to as "communication control configuration request information") that are inputted from the mobile station controller 13. The receiver 112 receives various types of data and control information from the base station apparatus 2 and outputs them to the mobile station controller 13.

The acquirer 131 acquires, via the second mobile station communicator 14, type information pertaining to the model of a communication device T and state information pertaining to the state of the communication device T. The communication control configuration controller 132 generates communication control configuration request information on the basis of the type information pertaining to the model of the communication device T, the state information pertaining to the state of the communication device T, and the communication control configuration information and communication control configuration request information table stored in the communication control configuration information storage 12. The communication processor 133 controls communication processing of the first mobile station communicator 11 and communication processing of the second mobile station communicator 14. The second mobile station communicator 14 uses the transmitter 141 and the receiver 142 to communicate with a communication device T.

The transmitter 141 transmits, to a communication device T, various types of data and control information that are inputted from the mobile station controller 13. The receiver 142 receives various types of data, control information, type information pertaining to the device type of a communication device T, and a state number corresponding to state information pertaining to the state of the communication device T from the communication device T and outputs them to the mobile station controller 13.

FIG. 3 is a table of communication control configuration information.

The communication control configuration number 1 corresponds to high-capacity downlink communication and, for example, corresponds to a communication mode that guarantees a peak data rate of 20 Gbit/s or higher.

The communication control configuration number 2 corresponds to high-capacity uplink communication and, for example, corresponds to a communication mode that guarantees a peak data rate of 10 Gbit/s or higher.

The communication control configuration number 3 corresponds to a low-delay communication level 1 and, for example, corresponds to a communication mode that guarantees a round-trip delay of 1 ms or shorter in a wireless section. Further, the communication control configuration number 4 corresponds to a low-delay communication level 2 and, for example, corresponds to a communication mode that guarantees a round-trip delay of 5 ms or shorter in a wireless section. Further, the communication control configuration number 5 corresponds to a low-delay communication level 3 and, for example, corresponds to a communication mode that guarantees a round-trip delay of 10 ms or shorter in a wireless section.

The communication control configuration number 6 corresponds to high-reliability communication and, for example, corresponds to a communication mode that guarantees a success rate of packet transmission of 99.999% or higher. The communication control configuration number 7 is reserved for future extension. The communication control configuration number 8 is intended to configure LTE-equivalent communication control. The communication modes of the communication control configuration numbers 1 to 8 may be configured alone, or communication modes of a plurality of communication control configuration numbers may be simultaneously configured. For example, the communication modes corresponding to the communication control configuration numbers 1 and 2, respectively, may be simultaneously configured. Further, the communication modes corresponding to the communication control configuration numbers 1, 2, and 5, respectively, may be simultaneously configured.

Base Station Apparatus

Figure 4:
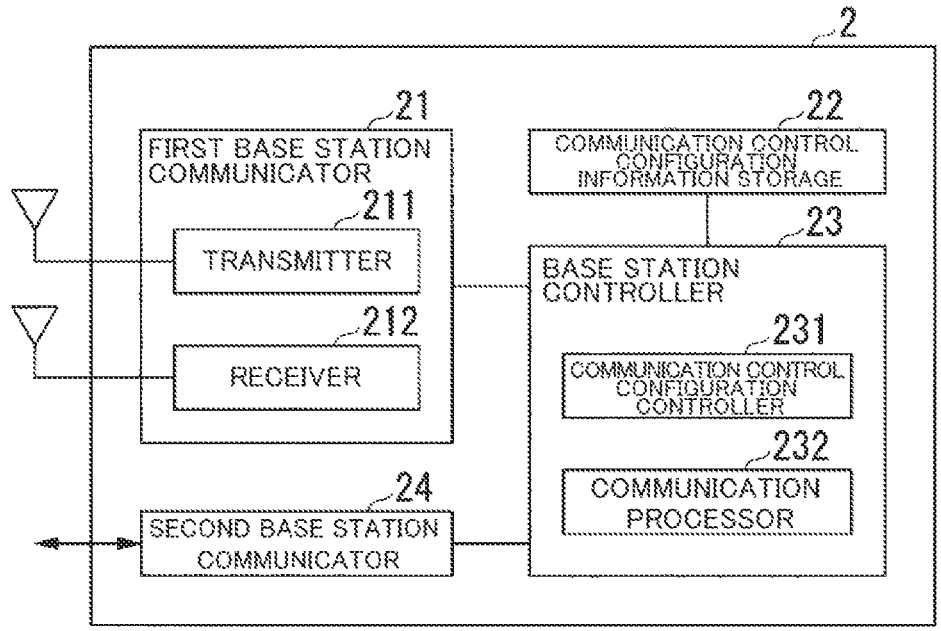
FIG. 4 is a block diagram of a base station apparatus according to the first embodiment.

FIG. 4 is a block diagram of the base station apparatus 2 according to the first embodiment. The base station apparatus 2 according to the first embodiment includes a first base station communicator 21, a communication control configuration information storage 22, a base station controller 23, and a second base station communicator 24. The first base station communicator 21 includes a transmitter 211 and a receiver 212. The base station controller 23 includes a communication control configuration controller 231 and a communication processor 232.

The first base station communicator 21 uses the transmitter 211 and the receiver 212 to communicate with the mobile station apparatus 1. The communication control configuration information storage 22 has stored therein communication control configuration information and a communication control configuration request information table. The transmitter 211 transmits, to the mobile station apparatus 1, various types of data and control information that are inputted from the base station controller 23. The receiver 212 receives various types of data, control information, and communication control configuration request information from the mobile station apparatus 1 and outputs them to the base station controller 23.

The communication control configuration controller 231 configures communication control over communication between the base station apparatus 2 and the mobile station apparatus 1 on the basis of the communication control configuration request information received from the mobile station apparatus 1 and the communication control configuration information stored in the communication control configuration information storage 22. Specifically, the communication control configuration controller 231 configures communication control over communication between the base station apparatus 2 and the mobile station apparatus 1 by extracting a communication control configuration number contained in the communication control configuration request information and selecting, from the communication control configuration information, a communication mode corresponding to the communication control configuration number thus extracted.

Note here that the communication control configuration controller 231 may configure communication control over communication between the mobile station apparatus 1 and a communication device T on the basis of the communication control configuration request information received from the mobile station apparatus 1 and the communication control configuration information stored in the communication control configuration information storage 22. Specifically, the communication processor 232 may transmit all communication control configuration numbers that have been extracted to the mobile station apparatus 1 via the first base station communicator 21. The mobile station apparatus 1 may receive via the first mobile station communicator 11 the communication control configuration numbers that are transmitted from the base station apparatus 2.

The communication processor 232 controls communication processing of the first base station communicator 21 and communication processing of the second base station communicator 24. Further, the communication processor 232 causes the first base station communicator 21 to perform communication in a communication mode configured by the communication control configuration controller 231. This causes the base station apparatus 2 to communicate with the mobile station apparatus 1 under communication control appropriate to a communication control configuration number. The second base station communicator 24 performs communication with the transmitting apparatus 3. Further, upon receiving a communication control configuration number from the base station apparatus 2, the communication control configuration controller 132 may read out a communication mode corresponding to the communication control configuration number from the communication control configuration information storage 12 and configure the communication mode for communication between the second mobile station communicator 14 and a communication device T.

Communication Device

Figure 5:
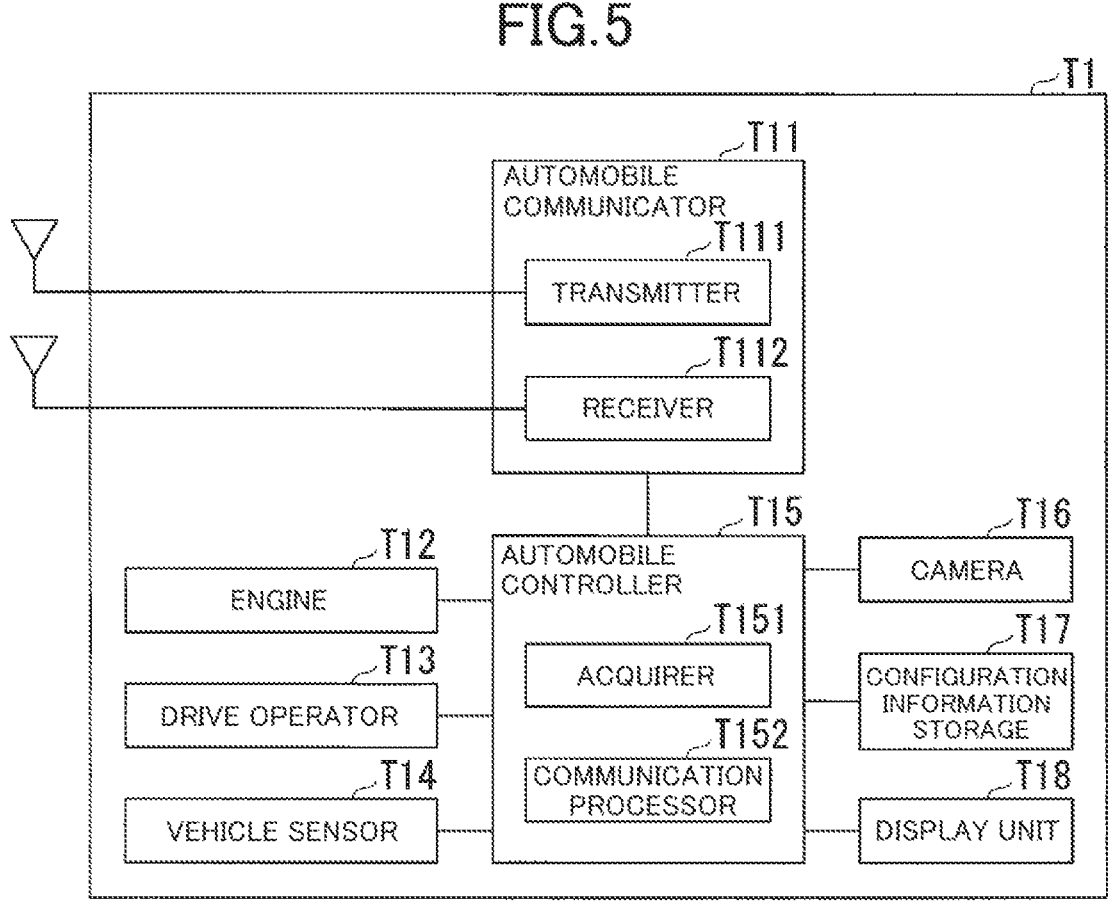
FIG. 5 is a block diagram of a communication device according to the first embodiment.

FIG. 5 is a block diagram of the automobile T1 according to the first embodiment. The automobile T1 is an example of a communication device T according to the first embodiment. The automobile T1 includes an automobile communicator T11, an engine T12, a drive operator T13, a vehicle sensor T14, an automobile controller T15, a camera T16, a configuration information storage T17, and a display unit T18. The automobile communicator T11 includes a transmitter T111 and a receiver T112. The automobile controller T15 includes an acquirer T151 and a communication processor T152.

The automobile communicator T11 uses the transmitter T111 and the receiver T112 to communicate with the mobile station apparatus 1. The engine T12 outputs, to a driving wheel (not illustrated), a driving force (torque) that causes the automobile T1 to run. The drive operator T13 includes, for example, an acceleration pedal, a brake pedal, a shift lever, a steering wheel, an odd-form steering, a joystick, and other operators. The drive operator T13 is equipped with a sensor that detects an amount of operation or the presence or absence of operation.

The vehicle sensor T14 includes a speed sensor that detects the speed of the automobile T1, an acceleration sensor that detects acceleration, an azimuth sensor that detects the orientation of the automobile T1, a ranging sensor such as a laser for use in collision avoidance or automatic driving, or other sensors. The camera T16 is a digital camera including a solid-state image sensing device such as a CCD (charge-coupled device) or a CMOS (complementary metal-oxide semiconductor).

The camera T16 is attached to any place on the automobile T1. The camera T16 for example takes an image of an area around the automobile T1 periodically-repeatedly. The configuration information storage T17 has stored therein information on the automobile T1. The information on the automobile T1 includes information indicating that T1 is an automobile and information pertaining to the model.

The acquirer T151 acquires state information pertaining to the state of the engine T12, the state of the drive operator T13, and the state of the vehicle sensor T14. Further, the acquirer T151 acquires image data captured by the camera T16. Further, the acquirer T151 acquires the information on the automobile T1 from the configuration information storage T17. At this time, the acquirer T151 sets "1" as the type information of the automobile T1.

In a case where the acquirer T151 has acquired, from the engine T12, the drive operator T13, or the vehicle sensor T14, information indicating that the automobile T1 is running, the acquirer T151 sets "1" as the first state number. In a case where the acquirer T151 has acquired, from the drive operator T13 or the vehicle sensor T14, information indicating that the automobile T1 is not running, the acquirer T151 sets "2" as the first state number.

A determination as to whether the automobile T1 is running may be based on state information indicating whether the engine T12 is operating. Alternatively, a determination as to whether the automobile T1 is running may be based on state information indicating, for example, that the accelerator has been pressed down on or the brakes have been released.

In a case where the acquirer T151 has acquired, from the vehicle sensor T14, information indicating that the running speed of the automobile T1 is 30 km/h or higher, the acquirer T151 sets "1" as the second state number. In a case where the acquirer T151 has acquired, from the vehicle sensor T14, information indicating that the running speed of the automobile T1 is 10 km/h or higher and less than 30 km/h, the acquirer T151 sets "2" as the second state number. In a case where the acquirer T151 has acquired, from the vehicle sensor T14, information indicating that the running speed of the automobile T1 is 5 km/h or higher and less than 10 km/h, the acquirer T151 sets "3" as the second state number. In a case where the acquirer T151 has acquired, from the vehicle sensor T14, information indicating that the running speed of the automobile T1 is less than 5 km/h, the acquirer T151 sets "4" as the second state number.

In a case where the automobile T1 is not running and a vehicle other than the automobile T1 shows up on the image data thus captured, the acquirer T151 may set "2" as the first state number and set "1" as the second state number. In a case where "2" has been set as the first state number and "1" has been set as the second state number, the acquirer T151 may determine that there is a possibility that the automobile T1 might be rear-ended by another vehicle.

In a case where the automobile T1 is not running and no vehicle other than the automobile T1 shows up on the image data thus captured, the acquirer T151 may set "2" as the first state number and set "2" as the second state number. In a case where "2" has been set as the first state number and "2" has been set as the second state number, the acquirer T151 may determine that there is no possibility that the automobile T1 might be rear-ended by another vehicle. The communication processor T152 controls how the automobile communicator T11 operates. Further, the communication processor T152 exercises control of using the automobile communicator T11 to transmit the type information, the first and second state numbers pertaining to states, and the image data to the mobile station apparatus 1.

The following describes an example of a process by which the mobile station apparatus 1 sets up a communication control configuration between the mobile station apparatus 1 and the base station apparatus 2. The mobile station apparatus 1 generates a communication control configuration request for communication between the mobile station apparatus 1 and the base station apparatus 2 on the basis of the communication control configuration information table shown in FIG. 3, the communication control configuration request information table shown in FIG. 6, and the flow charts shown in FIGS. 7 and 8.

Figure 8:
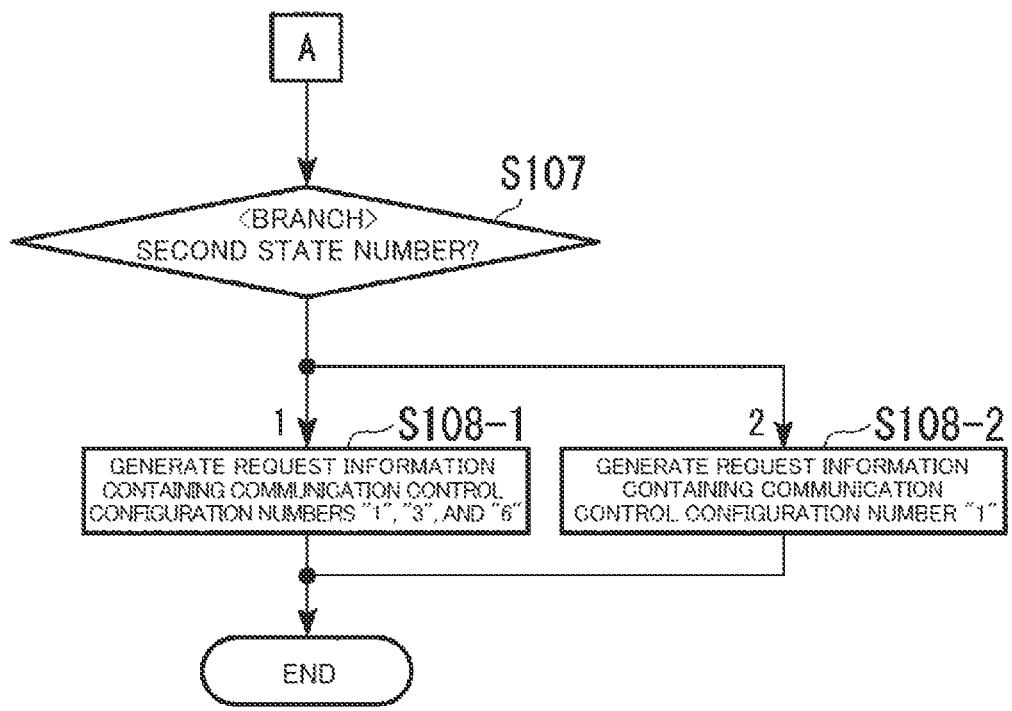
FIG. 8 is a flow chart showing an example of flow of the process of the mobile station apparatus in the communication systems according to the first to fifth embodiments of the present disclosure.

The communication control configuration request information table shown in FIG. 6 shows, in association with device type information and state information, the communication control configuration numbers of communication devices T that are connected to the mobile station apparatus 1. The communication control configuration request information table is stored in the communication control configuration information storage 12. FIGS. 7 and 8 are flow charts showing an example of a process by which the mobile station apparatus 1 according to the first embodiment configures communication control between the mobile station apparatus 1 and the base station apparatus 2.

In step S100, the acquirer 131 acquires, via the receiver 112, type information pertaining to the device type of a communication device T connected to the mobile station apparatus 1. In step S101, the communication control configuration controller 132 determines the presence or absence of type information. In the presence of type information, the communication control configuration controller 132 proceeds to step S102. In the absence of type information, the communication control configuration controller 132 ends the control.

In a case where the type information thus acquired is "1", the communication control configuration controller 132 proceeds to step S103, in which the acquirer 131 acquires state information of the automobile T1, i.e. a first state number and a second state number that correspond to first state information and second state information, respectively. A case where the type information thus acquired is an integer of 2 to 5 will be described in the second and subsequent embodiments. In a case where the type information thus acquired is not an integer of 1 to 5, the communication control configuration controller 132 ends the control.

In step S104, the communication control configuration controller 132 evaluates the first state information thus acquired. In a case where the first state number is "1", the communication control configuration controller 132 proceeds to step S105. In a case where the first state number is "2", the communication control configuration controller 132 proceeds to step S107 of FIG. 8 via step A.

In step S105, the communication control configuration controller 132 evaluates the second state information thus acquired. In a case where the second state number is "1", the communication control configuration controller 132 proceeds to step S106-1. In a case where the second state number is "2", the communication control configuration controller 132 proceeds to step S106-2. In a case where the second state number is "3", the communication control configuration controller 132 proceeds to step S106-3. In a case where the second state number is "4", the communication control configuration controller 132 proceeds to step S106-4. In a case where the second station number is not an integer of "1" to "4", the communication control configuration controller 132 ends the control.

Note here that a case where the type information is "1", the first state number is "1", and the second state number is "1" is a case where the running speed of the automobile T1 is 30 km/h or higher. In this case, the communication control configuration controller 132 proceeds to step S106-1, in which the communication control configuration controller 132 reads out the communication control configuration numbers "3" and "6" on the basis of the communication control configuration request information table. Then, the communication control configuration controller 132 generates communication control configuration request information containing the communication control configuration numbers "3" and "6".

Note here that a case where the type information is "1", the first state number is "1", and the second state number is "2" is a case where the automobile T1 is in a state of running at a speed of 10 km/h or higher and less than 30 km/h. In this case, the communication control configuration controller 132 proceeds to step S106-2, in which the communication control configuration controller 132 reads out the communication control configuration numbers "4" and "6" on the basis of the communication control configuration request information table. Then, the communication control configuration controller 132 generates communication control configuration request information containing the communication control configuration numbers "4" and "6".

Note here that a case where the type information is "1", the first state number is "1", and the second state number is "3" is a case where the automobile T1 is in a state of running at a speed of 5 km/h or higher and less than 10 km/h. In this case, the communication control configuration controller 132 proceeds to step S106-3, in which the communication control configuration controller 132 reads out the communication control configuration numbers "5" and "6" on the basis of the communication control configuration request information table. Then, the communication control configuration controller 132 generates communication control configuration request information containing the communication control configuration numbers "5" and "6".

Note here that a case where the type information is "1", the first state number is "1", and the second state number is "4" is a case where the automobile T1 is in a state of running at a speed of less than 5 km/h. In this case, the communication control configuration controller 132 proceeds to step S106-4, in which the communication control configuration controller 132 reads out the communication control configuration number "8" on the basis of the communication control configuration request information table. Then, the communication control configuration controller 132 generates communication control configuration request information containing the communication control configuration number "8".

In step S107, the communication control configuration controller 132 evaluates the second state number.

In a case where the second state number is "1", the communication control configuration controller 132 may proceed to step S108-1 to read out the communication control configuration numbers "1", "3", and "6" on the basis of the communication control configuration request information table. Then, the communication control configuration controller 132 may generate communication control configuration request information containing the communication control configuration numbers "1", "3", and "6".

Note here that a case where the type information is "1", the first state number is "2", and the second state number is "1" is a case where the automobile T1 is in a state of not running and is in a state of having a possibility of being rear-ended by another vehicle. In this case, high-definition visual content or the like that requires a high-capacity downlink communication configuration may be viewed via the display unit T18.

Further, in a case where the second state number is "2" is step S107, the communication control configuration controller 132 may read out the communication control configuration number "1" in step S106-2. Then, the communication control configuration controller 132 may generate communication control configuration request information containing the communication control configuration number "1". Note here that a case where the type information is "1", the first state number is "2", and the second state number is "2" is a case where the automobile T1 is in a state of not running and is in a state of having no possibility of being rear-ended by another vehicle.

In this case, high-definition visual content or the like that requires a high-capacity downlink communication configuration may be viewed via the display unit T18.

The communication processor 133 of the mobile station apparatus 1 controls the transmitter 111 so that the transmitter 111 transmits the communication control configuration request information thus generated to the base station apparatus 2. The communication control configuration request information thus generated contains a communication control configuration number of the communication control configuration information. The receiver 212 of the base station apparatus 2 receives the communication control configuration request information from the transmitter 111. The communication control configuration controller 231 reads out a communication mode corresponding to the communication control configuration number from the communication control configuration information of the communication control configuration information storage 22.

The communication processor 232 controls the first base station communicator 21 so that the first base station communicator 21 sets up a communication control configuration corresponding to the communication mode thus read out. The first base station communicator 21 uses the transmitter 211 and the receiver 212 to configure communication control configured by the communication control configuration controller 231 over communication with the mobile station apparatus 1.

Note here that the communication processor 232 may cause the transmitter 211 to transmit, to the mobile station apparatus 1, a communication control configuration number corresponding to a communication mode read out from the communication control configuration information of the communication control configuration information storage 22. The communication control configuration controller 132 of the mobile station apparatus 1 may read out, from the communication control configuration information of the communication control configuration information storage 12, a communication mode corresponding to the communication control configuration number thus received and exercise control to configure the settings for communication with the communication device T.

As described above, the communication system S according to the first embodiment includes the communication devices T, the mobile station apparatus 1, and the base station apparatus 2, and the mobile station apparatus 1 includes the first mobile station communicator 11, the second mobile station communicator 12, and the mobile station controller 13. The first mobile station communicator 11 communicates with the base station apparatus 2. The second mobile station communicator 12 communicates with the communication devices T. The second mobile station communicator 12 receives device type information of any of the communication devices T.

The mobile station controller 13 generates, on the basis of the device type information, request information for requesting a communication control configuration of communication with the communication device T. Further, the mobile station apparatus 1 includes the transmitter 111. The transmitter 111 transmits the request information to the base station apparatus 2. In accordance with the request information received from the mobile station apparatus 1, the base station apparatus 2 configures communication control over communication with the mobile station apparatus 1.

With this, in the communication system S, high-capacity, superlow-delay, and/or superhigh-reliability communication control can be configured according to the type of a communication device T connected to the mobile station apparatus 1. Accordingly, in the communication system S, proper communication control appropriate to the type of the communication device T connected to the mobile station apparatus 1 can be configured.

Further, the mobile station controller 13 generates, on the basis of the device type information, request information for requesting a communication control configuration of communication with the communication device T. Further, the mobile station apparatus 1 includes the transmitter 111. The transmitter 111 transmits the request information to the base station apparatus 2. In accordance with the request information received from the mobile station apparatus 1, the base station apparatus 2 configures communication control over communication with the mobile station apparatus 1. The transmitter 211 transmits, to the mobile station apparatus 1, information pertaining to the communication control thus configured. On the basis of the information pertaining to the communication control thus configured, the communication control configuration controller 132 of the mobile station apparatus 1 configures communication control over communication with the communication device T.

With this, in the communication system S, high-capacity, superlow-delay, and/or superhigh-reliability communication control can be configured according to the type of a communication device T connected to the mobile station apparatus 1. Accordingly, in the communication system S, proper communication control appropriate to the type of the communication device T connected to the mobile station apparatus 1 can be configured over communication between the mobile station apparatus 1 and the communication device T.

Further, the communication system S according to the first embodiment includes the communication devices T, the mobile station apparatus 1, and the base station apparatus 2, and the mobile station apparatus 1 includes the first mobile station communicator 11, the second mobile station communicator 12, and the mobile station controller 13. The second mobile station communicator 12 receives state information of any of the communication devices T. The state information may indicate that the communication device T connected is running. The mobile station controller 13 acquires the state information and generates request information for requesting a communication control configuration of communication with the communication device T.

With this, in the communication system S, high-capacity, superlow-delay, and/or superhigh-reliability communication control can be configured according to the type of a communication device T connected to the mobile station apparatus 1. Accordingly, in the communication system S, proper communication control appropriate to the state of the communication device T connected to the mobile station apparatus 1 can be configured.

Further, the communication system S according to the first embodiment includes the communication devices T, the mobile station apparatus 1, and the base station apparatus 2, and the mobile station apparatus 1 includes the first mobile station communicator 11, the second mobile station communicator 12, and the mobile station controller 13. The second mobile station communicator 12 receives state information of an engine of a vehicle that is a communication device T connected. The mobile station controller 13 acquires the state information. The mobile station controller 13 generates request information for requesting a communication control configuration of communication with the automobile T1.

With this, in a case where a vehicle that is a communication device T connected to the mobile station apparatus 1 is running, the communication control configuration controller 132 can configure superlow-delay and superhigh-reliability communication control.

Accordingly, in the communication system S, proper communication control appropriate to the state of the engine T12 of the vehicle that is the communication device T connected to the mobile station apparatus 1 can be configured.

Further, the communication system S according to the first embodiment includes the communication devices T, the mobile station apparatus 1, and the base station apparatus 2, and the mobile station apparatus 1 includes the first mobile station communicator 11, the second mobile station communicator 12, and the mobile station controller 13. The second mobile station communicator 12 receives state information indicating that a communication device T connected is running. The mobile station controller 13 acquires the state information and generates request information for requesting a communication control configuration with of communication the communication device T.

With this, in a case where a vehicle that is a communication device T connected to the mobile station apparatus 1 is running, the communication control configuration controller 132 can configure superlow-delay and superhigh-reliability communication control. Accordingly, in the communication system S, proper communication control appropriate to the running state of the vehicle that is the communication device T connected to the mobile station apparatus 1 can be configured.

Second Embodiment

Next, a second embodiment of the present disclosure is described. In the second embodiment, a communication device T is a display device T3 such as a liquid crystal television. As in the case of the first embodiment, the display device T3 is connected to the base station apparatus 2 via the mobile station apparatus 1 by means of the tethering function of the mobile station apparatus 1.

The display device T3 sets "2" as type information, pertaining to a device type, that indicates that the communication device T is the display device T3. In a case where the display device T3 is displaying a picture or an image, the display device T3 sets "1" as the first state number. In a case where the display device T3 is not displaying a picture or an image, the display device T3 sets "2" as the first state number. Further, the display device T3 sets "1" as the second state number regardless of whether or not the display device T3 is displaying a picture or an image.

The display device T3 transmits the type information, the first state number, and the second state number to the mobile station apparatus 1. Next, an example of a process by which the mobile station apparatus 1 configures communication control between the mobile station apparatus 1 and the base station apparatus 2 is described with reference to the flow chart shown in FIG. 7.

The operation up to step S101 is the same as that of the first embodiment. In step S102, the communication control configuration controller 132 evaluates the type information. In a case where the type information is "2", the communication control configuration controller 132 proceeds to step S103. In a case where the type information thus acquired is not an integer of 1 to 5, the communication control configuration controller 132 ends the control.

In the second embodiment, the description of step S103 of FIG. 7 shall be read as "ACQUIRE STATE INFORMATION OF DISPLAY DEVICE". In step S103, the communication control configuration controller 132 acquires the state information, i.e. the first and second state numbers, of the display device T3 and proceeds to step S104. The operation of step S104 is the same as that of the first embodiment.

In step S105, the communication control configuration controller 132 evaluates the second state information thus acquired. In a case where the second state information is "1", the communication control configuration controller 132 proceeds to step S106-1. In the second embodiment, the description of step S106-1 of FIG. 7 shall be read as "GENERATE REQUEST INFORMATION CONTAINING COMMUNICATION CONTROL CONFIGURATION NUMBER '1'". Further, the description of step S106-2 of FIG. 7 shall be read as "GENERATE REQUEST INFORMATION CONTAINING COMMUNICATION CONTROL CONFIGURATION NUMBER '8'".

In a case where the second state number is "1", the communication control configuration controller 132 proceeds to step S106-1, in which the communication control configuration controller 132 reads out the communication control configuration number "1" on the basis of the communication control configuration request information table. Then, the communication control configuration controller 132 generates communication control configuration request information containing the communication control configuration number "1". That is, the communication control configuration controller 132 generates communication control configuration request information for requesting a communication control configuration of high-capacity downlink communication.

Note here that a case where the type information is "2" and the first state number is "1" represents a state where the display device T3 is displaying a picture or an image.

In a case where the second state number is "2", the communication control configuration controller 132 proceeds to step S106-2, in which the communication control configuration controller 132 reads out the communication control configuration number "8" on the basis of the communication control configuration request information table. Then, the communication control configuration controller 132 generates communication control configuration request information containing the communication control configuration number "8". Note here that a case where the type information is "2" and the first state number is "1" represents a state where the display device T3 is not displaying a picture or an image.

In accordance with the communication control configuration request information thus generated, communication control between the mobile station apparatus 1 and the base station apparatus 2 is configured in the same manner as that of the first embodiment.

The communication system S according to the second embodiment includes the communication devices T, the mobile station apparatus 1, and the base station apparatus 2, and the mobile station apparatus 1 includes the second mobile station communicator 12 and the mobile station controller 13. The second mobile station communicator 12 receives state information indicating whether or not the communication device T3 connected is displaying a picture or an image. The mobile station controller 13 acquires the state information and generates request information for respecting a communication control configuration between the mobile station apparatus 1 and the base station apparatus 2.

With this, in a case where a communication device T connected to the mobile station apparatus 1 is the display device T3 and the display device T3 is displaying a picture or an image, communication control of high-capacity downlink communication can be configured over communication between the mobile station apparatus 1 and the base station apparatus 2. Accordingly, in a case where the display device T3 is connected to the mobile station apparatus 1 in the communication system S, proper communication control can be configured according to the type of the communication device T connected and according to the state of the display device T3 connected to the mobile station apparatus 1.

With this, in a case where a communication device T connected to the mobile station apparatus 1 is the display device T3 and the display device T3 is displaying a picture or an image, communication control of high-capacity downlink communication can be configured. Accordingly, in the communication system S, proper communication control can be configured according to the state of the display device T3 connected to the mobile station apparatus 1.

Third Embodiment

Next, a third embodiment of the present disclosure is described. The third embodiment differs from the first embodiment in that the bicycle T2 is connected to the mobile station apparatus 1 during tethering. The bicycle T2 sets "3" as type information, pertaining to a device type, that indicates that a communication device T is the bicycle T2. The bicycle T2 sets "1" as the first state number in a case of having acquired information indicating that the bicycle T2 is running. The bicycle T2 sets "2" as the first state number in a case of having acquired information indicating that the bicycle T2 is not running.

The bicycle T2 sets "1" as the second state number in a case of having acquired information indicating that the running speed of the bicycle T2 is 5 km/h or higher. The bicycle T2 sets "2" as the second state number in a case of having acquired information indicating that the running speed of the bicycle T2 is less than 5 km/h. The bicycle T2 transmits the type information, the first state number, and the second state number to the mobile station apparatus 1. An example of a process by which to configure communication control between the mobile station apparatus 1 and the base station apparatus 2 is described with reference to the flow charts shown in FIGS. 7 and 8.

The operation up to step S101 is the same as that of the first embodiment. In step S102, the communication control configuration controller 132 evaluates the type information. In a case where the type information is "3", the communication control configuration controller 132 proceeds to step S103. In a case where the type information thus acquired is not an integer of 1 to 5, the communication control configuration controller 132 ends the control.

In the third embodiment, the description of step S103 of FIG. 7 shall be read as "ACQUIRE STATE INFORMATION OF BICYCLE T2". In step S103, the communication control configuration controller 132 acquires the state information, i.e. the first and second state numbers, of the bicycle T2 and proceeds to step S104. The operation of step S104 is the same as that of the first embodiment.

In step S105, the communication control configuration controller 132 evaluates the second state information thus acquired. In a case where the second state number is "1", the communication control configuration controller 132 proceeds to step S106-1. In a case where the second state number is "2", the communication control configuration controller 132 proceeds to step S106-2. In the third embodiment, the description of step S106-1 of FIG. 7 shall be read as "GENERATE REQUEST INFORMATION CONTAIN- ING COMMUNICATION CONTROL CONFIGURATION NUMBERS '3' and '6'". Further, the description of step S106-2 of FIG. 7 shall be read as "GENERATE REQUEST INFORMATION CONTAINING COMMUNICATION CONTROL CONFIGURATION NUMBERS '3' and '8'".

In a case where the second state number is "1", the communication control configuration controller 132 proceeds to step S106-1, in which the communication control configuration controller 132 reads out the communication control configuration numbers "3" and "6" on the basis of the communication control configuration request information table. Then, the communication control configuration controller 132 generates communication control configuration request information containing the communication control configuration numbers "3" and "6". That is, the communication control configuration controller 132 generates communication control configuration request information for requesting a superlow-delay and high-reliability communication control configuration. Note here that a case where the type information is "3", the first state number is "1", and the second state number is "1" represents a state where the bicycle T2 is running at a speed of 5 km/h or higher.

In step S106-2, the communication control configuration controller 132 reads out the communication control configuration numbers "3" and "8" on the basis of the communication control configuration request information table. Then, the communication control configuration controller 132 generates communication control configuration request information containing the communication control configuration numbers "3" and "8". That is, the communication control configuration controller 132 generates communication control configuration request information for requesting a superlow-delay and LTE-equivalent communication control configuration. Note here that a case where the type information is "3", the first state number is "1", and the second state number is "2" represents a state where the bicycle T2 is running at a speed of less than 5 km/h.

The communication control configuration controller 132 proceeds to step S108-1 via step S107 of FIG. 8. In the third embodiment, the description of step S108-1 of FIG. 8 shall be read as "GENERATE REQUEST INFORMATION CONTAINING COMMUNICATION CONTROL CONFIGURATION NUMBER '1'". In step S108-2, the communication control configuration controller 132 reads out the communication control configuration number "1" on the basis of the communication control configuration request information table. Then, the communication control configuration controller 132 generates communication control configuration request information containing the communication control configuration number "1". Note here that a case where the type information is "3", the first state number is "2", and the second state number is "1" represents a state where the bicycle T2 is not running.

In accordance with the communication control configuration request information thus generated, communication control between the mobile station apparatus 1 and the base station apparatus 2 is configured in the same manner as that of the first embodiment.

The communication system S according to the third embodiment includes the communication devices T, the mobile station apparatus 1, and the base station apparatus 2, and the mobile station apparatus 1 includes the second mobile station communicator 12 and the mobile station controller 13. The second mobile station communicator 12 receives state information pertaining to the running state of the bicycle T2, which is a communication device T connected. On the basis of the state information, the mobile station controller 13 generates request information for requesting a communication control configuration of communication with the bicycle T2.

With this, in a case where a communication device T connected to the mobile station apparatus 1 is the bicycle T2, communication control appropriate to the running speed can be configured. This makes it possible to, in performing tethering, configure proper communication control according to the state of the vehicle connected to the mobile station apparatus 1.

Fourth Embodiment

Next, a fourth embodiment of the present disclosure is described. The fourth embodiment differs from the first embodiment in that the camera T4 is connected to the mobile station apparatus 1. The camera T4 sets "4" as type information, pertaining to a device type, that indicates that a communication device T is the camera T4. The camera T4 sets "1" as the first state number in the case of a state of trying to upload a moving image. The camera T4 sets "2" as the first state number in the case of a state of trying to upload a still image. Further, the camera T4 sets "1" as the second state number regardless of the first state number.

The camera T4 transmits the type information, the first state information, and the second state information to the mobile station apparatus 1. Next, an example of a process by which the mobile station apparatus 1 configures communication control between the mobile station apparatus 1 and the base station apparatus 2 is described with reference to the flow chart shown in FIG. 7.

The operation up to step S101 is the same as that of the first embodiment. In step S102, the communication control configuration controller 132 evaluates the type information. In a case where the type information is "4", the communication control configuration controller 132 proceeds to step S103. In a case where the type information thus acquired is not an integer of 1 to 5, the communication control configuration controller 132 ends the control.

In the fourth embodiment, the description of step S103 of FIG. 7 shall be read as "ACQUIRE STATE INFORMATION OF CAMERA T4". In step S103, the communication control configuration controller 132 acquires the state information, i.e. the first and second state numbers, of the camera T4 and proceeds to step S104. The operation of step S104 is the same as that of the first embodiment.

In step S105, the communication control configuration controller 132 evaluates the second state information thus acquired. In a case where the second state number is "1", the communication control configuration controller 132 proceeds to step S106-1. In the fourth embodiment, the description of step S106-1 of FIG. 7 shall be read as "GENERATE REQUEST INFORMATION CONTAINING COMMUNICATION CONTROL CONFIGURATION NUMBER '2'". Further, the description of step S108-1 of FIG. 8 shall be read as "GENERATE REQUEST INFORMATION CONTAINING COMMUNICATION CONTROL CONFIGURATION NUMBER '8'".

In step S106-1, the communication control configuration controller 132 reads out the communication control configuration number "2" on the basis of the communication control configuration request information table. Then, the communication control configuration controller 132 generates communication control configuration request information containing the communication control configuration number "2". That is, the communication control configuration controller 132 generates communication control configuration request information for requesting a communication control configuration of high-capacity uplink communication. Note here that a case where the type information is "4", the first state number is "1", and the second state number is "1" represents a state where the camera T4 is trying to upload a moving image.

The communication control configuration controller 132 proceeds to step S108-1 via step S107. In step S108-1, the communication control configuration controller 132 reads out the communication control configuration number "8" on the basis of the communication control configuration request information table. Then, the communication control configuration controller 132 generates communication control configuration request information containing the communication control configuration number "8". Note here that a case where the type information is "4" and the first state number is "2" represents a state where the camera T4 is trying to upload a still image.

In accordance with the communication control configuration request information thus generated, communication control between the mobile station apparatus 1 and the base station apparatus 2 is configured in the same manner as that of the first embodiment.

The communication system S according to the fourth embodiment includes the communication devices T, the mobile station apparatus 1, and the base station apparatus 2, and the mobile station apparatus 1 includes the second mobile station communicator 12 and the mobile station controller 13. The second mobile station communicator 12 receives state information indicating that the camera T4, which is a communication device T connected, performs a predetermined operation. Examples of the predetermined operation include uploading of a moving image or uploading of a still image by the camera T4. On the basis of the state information, the mobile station controller 13 generates request information for requesting a communication control configuration of communication with the camera T4.

With this, in a case where a communication device T connected to the mobile station apparatus 1 is the camera T4, proper communication control appropriate to the operating state of the camera T4 can be configured.

Fifth Embodiment

Next, a fifth embodiment of the present disclosure is described. The fifth embodiment differs from the first embodiment in that the game machine T5 is connected to the mobile station apparatus 1. The game machine T5 sets "5" as type information, pertaining to a device type, that indicates that a communication device T is the game machine T5. The game machine T5 sets "1" as the first state number in the case of a state where a game of which high image quality is required is being operated.

The game machine T5 sets "2" as the first state number in the case of a state where a game of which low delay is required is being operated. Examples of the game of which low delay is required include a game in which a robot is remotely controlled. The game machine T5 sets "3" as the first state number in the case of a state where a game of which neither high image quality nor low delay is required is being operated. Examples of the game of which neither high image quality nor low delay is required include games such as go and shogi. Further, the game machine T5 sets "1" as the second state number regardless of the first state number.

Figure 9:
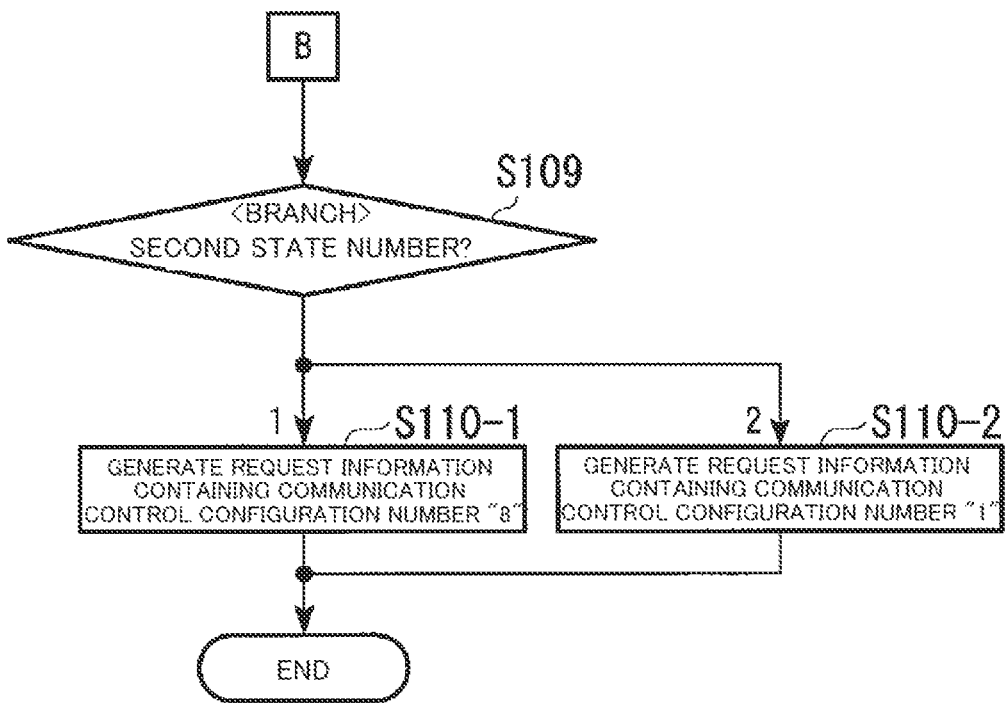
FIG. 9 is a flow chart showing an example of flow of the process of the mobile station apparatus in the communication system according to the fifth embodiment of the present disclosure.

The game machine T5 transmits the type information and the first state information to the mobile station apparatus 1. Next, an example of a process by which the mobile station apparatus 1 configures communication control between the mobile station apparatus 1 and the base station apparatus 2 is described with reference to the flow charts shown in FIGS. 7 to 9.

The operation up to step S101 is the same as that of the first embodiment. In step S102, the communication control configuration controller 132 evaluates the type information. In a case where the type information is "5", the communication control configuration controller 132 proceeds to step S103. In the fifth embodiment, the description of step S103 of FIG. 7 shall be read as "ACQUIRE STATE INFORMATION OF GAME MACHINE T5". In step S103, the communication control configuration controller 132 acquires the state information, i.e. the first and second state numbers, of the game machine T5 and proceeds to step S104. In a case where the type information thus acquired is not an integer of 1 to 5, the communication control configuration controller 132 ends the control.

In step S105, the communication control configuration controller 132 evaluates the value of the first state number. In a case where the first state number is "1", the communication control configuration controller 132 proceeds to step S105. In a case where the first state number is "2", the communication control configuration controller 132 proceeds to step S107 of FIG. 8 via step A. In a case where the first state number is "3", the communication control configuration controller 132 proceeds to step S109 of FIG. 9 via step B.

In step S105, the communication control configuration controller 132 evaluates the second state information thus acquired. In a case where the second state number is "1", the communication control configuration controller 132 proceeds to step S106-1. In the fifth embodiment, the description of step S106-1 of FIG. 7 shall be read as "GENERATE REQUEST INFORMATION CONTAINING COMMUNICATION CONTROL CONFIGURATION NUMBERS '1' and '2'". Further, the description of step S108-1 of FIG. 8 shall be read as "GENERATE REQUEST INFORMATION CONTAINING COMMUNICATION CONTROL CONFIGURATION NUMBERS '1', '2', and '3'".

In a case where the first state number is "1", the communication control configuration controller 132 proceeds to step S106-1, in which the communication control configuration controller 132 reads out the communication control configuration numbers "1" and "2" on the basis of the communication control configuration request information table. Then, the communication control configuration controller 132 generates communication control configuration request information containing the communication control configuration numbers "1" and "2". That is, the communication control configuration numbers "1" and "2" for requesting communication control configurations of high-capacity downlink communication and high-capacity uplink communication. Note here that a case where the type information is "5" and the first state number is "1" represents a state where a game of which high-definition images are required is being operated in the game machine T5.

In step S107 of FIG. 8, the communication control configuration controller 132 evaluates the second state number. In this case, where the second state number is "1", the communication control configuration controller 132 proceeds to step S108-1. In step S108-1, the communication control configuration controller 132 reads out the communication control configuration numbers "1", "2", and "3" on the basis of the communication control configuration request information table. Then, the communication control configuration controller 132 generates communication control configuration request information containing the communication control configuration numbers "1", "2", and "3". Note here that a case where the type information is "5" and the first state number is "2" represents a state where a game of which high-capacity downlink communication, high-capacity uplink communication, and low delay are required is being operated in the game machine T5.

In step S109, the communication control configuration controller 132 evaluates the second state number. In this case, where the second state number is "1", the communication control configuration controller 132 proceeds to step S110-1. In step S110-1, the communication control configuration controller 132 reads out the communication control configuration number "8" on the basis of the communication control configuration request information table. Then, the communication control configuration controller 132 generates communication control configuration request information containing the communication control configuration number "8". Note here that a case where the type information is "5" and the first state number is "3" represents a state where a game of which neither high-definition images nor low delay is required is being operated in the game machine T5.

In accordance with the communication control configuration request information thus generated, communication control between the mobile station apparatus 1 and the base station apparatus 2 is configured in the same manner as that of the first embodiment.

The communication system S according to the fifth embodiment includes the communication devices T, the mobile station apparatus 1, and the base station apparatus 2, and the mobile station apparatus 1 includes the second mobile station communicator 12 and the mobile station controller 13. The second mobile communicator 12 receives state information indicating whether a predetermined game is being played on the game machine 5, which is a communication device T connected. Examples of the state information include state information indicating whether a game of which high-definition images are required is being operated or whether a game of which low delay is required is being operated in the game machine T5. On the basis of the state information, the mobile station controller 13 generates request information for requesting a communication control configuration of communication with the game machine T5.

With this, in a case where a communication device T connected to the mobile station apparatus 1 is the game machine T5, proper communication control can be configured according to whether a predetermined game is being played on the game machine T5.

Further, in configuring the communication modes corresponding to the communication control configuration information of FIG. 3, the communication systems S according to the first to fifth embodiments may switch from LTE-equivalent band control to 5G communication band control. Note here that the LTE-equivalent band control may correspond, for example, to the communication control configuration number "8". The 5G communication band control may correspond, for example, to any of the communication control configuration numbers "1" to "6".

Further, in configuring the communication modes corresponding to the communication control configuration numbers "1" to "6" of the communication control configuration information of FIG. 3, the communication systems S according to the first to fifth embodiments may perform beamforming through the use of a band of higher frequencies. The communication processor 232 may control the first base station communicator 21 so that the first base station communicator 21 performs beamforming through the use of a band of higher frequencies. The band of higher frequencies may for example be a 3.6 GHz to 6 GHz or higher frequency band or a 28 GHz frequency band. Beamforming is a technique, used for transmission and reception through the transmitter 211 and the receiver 212, by which to effect adaptive changes in the direction of radio waves.

This allows the communication system S to, on the basis of type information and state information pertaining to a device type acquired from a communication device T, configure proper communication control according to the device type and state.

This allows the communication system S to, on the basis of type information and state information pertaining to a device type acquired from a communication device T, configure proper communication control appropriate to the device type and state.

Further, in configuring the communication modes corresponding to the communication control configuration numbers "1" to "6" of the communication control configuration information of FIG. 3 in the communication systems S according to the first to fifth embodiments, the communication processor 232 may control the first mobile station communicator 11 so that the first mobile station communicator 11 performs communication with variations in time slot length or symbol length according to subcarrier spacing.

This allows the communication system S to, on the basis of type information and state information pertaining to a device type acquired from a communication device T connected to the mobile station apparatus 1, configure proper communication control according to the device type and state.

A program that operates in a mobile station apparatus 1 of a communication system S according to an aspect of the present disclosure may be a program (program that causes a computer to function) that controls one or a plurality of processors such as CPUs (central processing units) so as to achieve the functions shown in any of the embodiments and modifications described above concerning an aspect of the present disclosure. Moreover, information that is handled by these apparatuses may be temporarily accumulated in a RAM (random-access memory) at the time of processing thereof, then stored in various types of storage such as a flash memory and an HDD (hard disk drive), and read out, altered, or written by a CPU as needed.

Part or the whole of the mobile station apparatus 1 of the communication system S according to any of the embodiments and modifications described above may be achieved by a computer including one or a plurality of processors. In that case, it may be achieved by recording, on a computer-readable recording medium, a program for achieving this control function and by causing a computer system to read the program recorded on this recording medium. The term "computer system" here refers to a computer system contained in the mobile station apparatus 1 of the communication system S, and encompasses hardware such as an OS and peripheral equipment. Further, the term "computer-readable recording medium" refers to a portable medium such as a flexible disk, a magneto-optical disk, a ROM, and a CD-ROM and a storage device, such as a hard disk, that is contained in the computer system. Furthermore, the term "computer-readable recording medium" may also encompass one that dynamically retains a program for a short period of time, such as a communication wire used for transmission of a program via a network such as the Internet or a communication line such as a telephone line, or one that retains a program for a certain period of time, such as a volatile memory situated inside a computer system serving as a server or a client. Further, the program may be one used for achieving part of the aforementioned function or may be one that can achieve the aforementioned function in combination with a program already recorded in the computer system.

Further, part or the whole of the mobile station apparatus 1 of the communication system S according to any of the embodiments and modifications described above may be achieved as an LSI circuit that is typically an integrated circuit or may be achieved as a chip set. Further, each functional block of the mobile station apparatus 1 of the communication system S according to any of the embodiments and modifications described above may individually take the form of a chip or may be partially or wholly integrated into the form of a chip. Further, a technique for circuit integration is not limited to LSI but may be achieved by a dedicated circuit and/or a general-purpose processor. Further, in a case where the advance of semiconductor technology gives rise to a circuit integration technique that replaces LSI, an integrated circuit based on the technique may be used.

In the foregoing, a detailed description has been given with reference to the drawings of each embodiment or modification according to an aspect of the present disclosure, no concrete configuration is limited to any embodiment or modification, and a design change or the like that does not depart from the scope of the present disclosure is also encompassed. Further, an aspect of the present disclosure may be changed in various ways within the scope of the claims, and an embodiment based on a proper combination of technical means disclosed in different embodiments is also encompassed in the technical scope of the present disclosure. Further, a configuration based on mutual substitution of elements, described in any of the embodiments and modifications described above, that bring about similar effects is also encompassed.

For example, an aspect of the present disclosure may be achieved by combining some or all of the embodiments and modifications described above.

The present disclosure contains subject matter related to that disclosed in Japanese Priority Patent Application JP 2018-149555 filed in the Japan Patent Office on Aug. 8, 2018, the entire contents of which are hereby incorporated by reference.

What is claimed is:

1. A communication system comprising:
a base station apparatus;
a mobile station apparatus; and
a communication device,
wherein the base station apparatus performs communication with one or a plurality of the communication devices via the mobile station apparatus,
the mobile station apparatus includes a first mobile station communicator, a second mobile station communicator, and a mobile station controller,
the first mobile station communicator performs first communication with the base station apparatus,
the second mobile station communicator performs second communication with the communication device,
the mobile station controller acquires a device type of the communication device and, on the basis of the device type thus acquired and a communication control configuration table including the device type in association with a communication mode appropriate to a communication speed, a communication delay, or communication reliability, generates request information for requesting the base station apparatus for a communication control configuration including the communication mode associated with the device type as a communication control configuration of the first communication,
the base station apparatus includes a base station controller, and
in accordance with the request information, the base station controller configures the communication control configuration of the first communication with the mobile station apparatus to the communication control configuration including the communication mode associated with the device type.

2. The communication system according to claim 1, wherein in accordance with the communication control configured over the first communication, the mobile station controller configures communication control appropriate to the device type of the communication device over the second communication between the mobile station apparatus and the communication device.

3. The communication system according to claim 1, wherein the mobile station controller acquires state information corresponding to the device type of the communication device and indicating a state of the communication device and generates the request information on the basis of the state information.

4. The communication system according to claim 3, wherein the mobile station controller generates the request information on the basis of state information indicating a state of a driving part of a vehicle.

5. The communication system according to claim 3, wherein the mobile station controller generates the request information on the basis of state information indicating a state of running of a vehicle.

6. The communication system according to claim 3, wherein the mobile station controller generates the request information on the basis of state information indicating a display state of a display device.

7. The communication system according to claim 1, wherein in accordance with the request information, the base station controller switches the first communication to a higher frequency band of communication based on beamforming.

8. The communication system according to claim 1, wherein in accordance with the request information, the base station controller switches the first communication to communication whose slot length or symbol length varies according to subcarrier spacing.

9. A mobile station apparatus comprising:
a first mobile station communicator;
a second mobile station communicator; and
a mobile station controller,
wherein the first mobile station communicator performs first communication with the base station apparatus,
the second mobile station communicator performs second communication with one or a plurality of communication devices,
the mobile station controller acquires a device type of any of the communication devices and, on the basis of the device type thus acquired and a communication control configuration table including the device type in association with a communication mode appropriate to a communication speed, a communication delay, or communication reliability, generates request information for respecting the base station apparatus for a communication control configuration including the communication mode associated with the device type as a communication control configuration of the first communication.

10. A base station apparatus comprising:
a base station communicator; and
a base station controller,
wherein the base station communicator performs communication with a mobile station apparatus and receives, from the mobile station apparatus, request information for requesting the base station apparatus for a communication control configuration including a communication mode associated with a device type of a communication device as a communication control configuration of the communication, the request information being generated on the basis of the device type and a communication control configuration table including the device type in association with the communication mode appropriate to a communication speed, a communication delay, or communication reliability, and
in accordance with the request information, the base station controller configures the communication control configuration of the first communication with the mobile station apparatus to the communication control configuration including the communication mode associated with the device type.

11. A communication device comprising:
a communication device controller; and
a communication device communicator,
wherein the communication device controller acquires a device type of the communication device,
the communication device communicator performs communication with a mobile station apparatus, transmits the device type to the mobile station apparatus, and performs communication with a base station apparatus via the mobile station apparatus in a communication control configuration including a communication mode associated with the device type transmitted by the communication device communicator, the communication mode being determined on the basis of the device type and a communication control configuration table including the device type in association with the communication mode appropriate to a communication speed, a communication delay, or communication reliability, by the mobile station apparatus.

12. A communication method of a mobile station apparatus, the communication method comprising:
performing first communication with a base station apparatus;
performing second communication with one or a plurality of communication devices;
acquiring a device type of any of the communication devices; and
generating, on the basis of the device type thus acquired and a communication control configuration table including the device type in association with a communication mode appropriate to a communication speed, a communication delay, or communication reliability, request information for requesting the base station apparatus for a communication control configuration including the communication mode associated with the device type as a communication control configuration of the first communication.

* * * * *